United States Patent [19]

Salvia et al.

[11] Patent Number: 5,492,042
[45] Date of Patent: Feb. 20, 1996

[54] ADJUSTABLE WORKPIECE HOLDER FOR SHAFT CUTTING

[76] Inventors: Matthew Salvia, Box 466 Cold Spring Rd., Stanfordville, N.Y. 12581; Gary J. Norton, 45 Golden Hill, Lee, Mass. 01238

[21] Appl. No.: 165,892

[22] Filed: Dec. 14, 1993

[51] Int. Cl.$^6$ ............................................. B26D 7/06
[52] U.S. Cl. ....................... 83/411.4; 83/104; 83/105; 83/468.2
[58] Field of Search ...................... 83/411.3, 411.5, 83/411.4, 468.1, 468.2, 468.7, 105, 104; 269/315, 297, 87.2, 295, 71

[56] References Cited

U.S. PATENT DOCUMENTS

| | | | |
|---|---|---|---|
| 933,965 | 9/1909 | Endres | 83/411.4 |
| 1,438,888 | 12/1922 | Barton | 269/315 |
| 1,499,812 | 7/1924 | Erickson | 83/411.4 |
| 1,566,191 | 11/1925 | Fleischel et al. | 83/411.4 |
| 2,451,733 | 10/1948 | Hochwarder | 269/315 |
| 2,731,989 | 1/1956 | Valcourt et al. | 269/315 |
| 3,066,564 | 12/1962 | Carpenter | 83/411.4 |
| 3,253,333 | 5/1966 | Keiter | 83/411.4 |
| 4,063,480 | 12/1977 | Hinzmann | 83/411.6 |
| 4,082,025 | 4/1978 | Reinbacher | 83/411.4 |

*Primary Examiner*—Richard K. Seidel
*Assistant Examiner*—Allan M. Schrock
*Attorney, Agent, or Firm*—James A. Wong

[57] ABSTRACT

A device is disclosed for use in cutting specific lengths from the end of a shaft, specifically the shaft of a golf club. It includes a base that allows the user to affix the device to a table or support surface and a support block that can be rotated in relation to the table where the axis of rotation is parallel to and fixed in relation to the table. The support block has a calibrated stop rod, a handle to facilitate the rotation, a shaft or workpiece cradle, and a cutting slot that extends through the cradle in the support block. The calibrated stop rod is held in the desired position by a threaded rod being turned and thus urged against it when the desired cutting length is indicated by calibrating marks or indicia thereon. The shaft is then placed in the cradle and the device is rotated such that a cutting blade moves through the cutting slot, severing the shaft at the desired point.

10 Claims, 2 Drawing Sheets

ADJUSTABLE WORKPIECE HOLDER FOR SHAFT CUTTING

BACKGROUND OF THE INVENTION

1. Field of the Invention

The present invention relates to workpiece holders. More specifically, it relates to workpiece holders wherein a predetermined portion of the shaft is measured out and then held in position by the device for cutting. Even more specifically, it relates to a device that, while the workpiece is being held, is rotatable to bring the workpiece into contact with the cutting blade. In general, however, the workpiece holder of this invention could be used to conveniently and precisely hold and manipulate any piece of bar stock upon which a machining operation is to be performed.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for holding various workpieces in place for cutting are old and well known in the art. Many manual cutting operations provide a holder or jig to hold the work stationary while the tool is manually moved. However, this invention is of the type where a rotating cutting tool is in a stationary relative position and the workpiece holder allows for precise manual moving of the work to and from the cutter. The applicant is unaware of any prior art that anticipates or makes obvious the instant invention as claimed.

In customizing a set of golf clubs for a buyer, it is occasionally necessary to shorten the shaft of a club so that it can be more comfortably swung. Prior manual methods of accomplishing this have been awkward and time consuming. The present invention allows the shortening of the club shaft to be accomplished in a precise and simple manner. An adjustable stop rod having calibrated measurement markings thereon is provided to limit the distance that the workpiece shaft can travel past the cutting area. This stop rod extends transversely through the support block of the device and is held at a predetermined location by a threaded extension within a cooperating bore which extends perpendicular with the stop rod itself. This threaded extension is integral with the support block grip and manipulating handle. By rotating the handle, the end of the threaded extension is forced against the stop rod, holding it in place. In an alternative embodiment, a thumbscrew protruding from the support block is used to hold the stop rod in place. The device includes a base having means to secure it to any flat surface and a pair of vertical members disposed so that the support block is pivotally suspended therebetween. Extending parallel to the stop bar is a workpiece cradle cut into the support block. The cradle has, extending both through it and the support block, a cutting slot perpendicular therewith. The stop rod is, with the aid of the marks thereon, manipulated to a predetermined position that will allow for the cutting of a specific length from the end of the workpiece. The workpiece shaft is then placed in the cradle and moved to the limit allowed by the stop rod. The support block is then rotated in relation to the fixed base such that a cutting blade enters the cutting slot.

SUMMARY OF THE INVENTION

The present invention is a device for use in cutting specific lengths from the end of a shaft, specifically the shaft of a golf club. It includes a base with means to affix the device to a table or support surface, and a support block that can be rotated in relation to the table, the axis of rotation being parallel to and fixed in relation to the table. The support block has a calibrated stop rod, a handle to facilitate its rotation, a shaft or workpiece cradle, and a cutting slot that extends both through the workpiece cradle and the support block. The calibrated stop rod is held in the desired position by a threaded rod being rotated and thus urged against it when the desired cutting length is indicated by calibrating marks or indicia thereon. The shaft is then placed in the cradle and the device is rotated such that a cutting blade enters the cutting slot, severing the shaft at the desired point.

Accordingly, it is a principal object of the invention to provide a workholder for cutting any specific predetermined length from a shaft or bar stock wherein the length to be cut is easily set by the user.

It is another object of the invention to provide a workholder for cutting any specific predetermined length from a shaft wherein after the cutting length is determined and set, the workpiece supporting member is rotated such that a cutting blade passes through a cutting slot to sever the shaft at the predetermined distance from its end.

It is a further object of the invention to provide a workholder for cutting specific predetermined lengths from a shaft wherein the stop rod for limiting the travel of the workpiece shaft is held in the desired position by an adjustable threaded member pressing against it.

Still another object of the invention is to provide a workholder for cutting any specific predetermined length from a shaft wherein the threaded holding member is easily manipulated to allow the user quickly change the length which is to be cut off of various shaft workpieces.

It is a major goal of the invention to provide improved elements and arrangements thereof in an apparatus for the purposes described which is inexpensive, dependable and fully effective in accomplishing its intended purposes.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
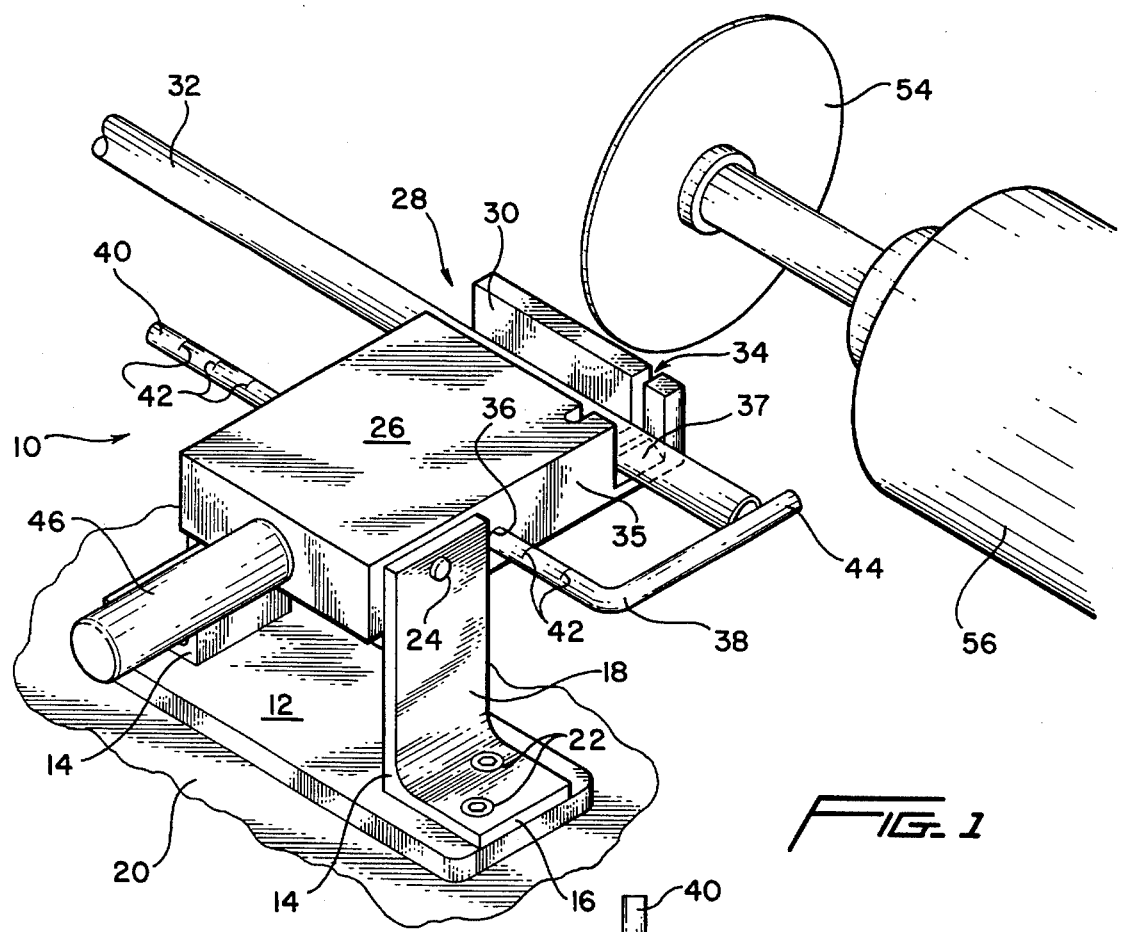
FIG. 1 is an environmental perspective view of the preferred embodiment of the present invention.

The present invention is indicated generally at 10 and is a workpiece holder for the measured cutting of sections of shafts, more specifically, the shafts of golf clubs. Although throughout this specification, golf club shafts are mentioned, it should be understood that other types of shafts could be cut to lengths using the apparatus as described hereinafter. The artisan will recognize that bars, pipes, shafts, and all other forms of elongated bar stock material could easily be adapted for cutting to length with the instant invention. The device has a base 12 that has attached thereto a pair of L-shaped support brackets 14. These are attached to the base, and through it to the table or supporting surface 20, by anchoring means such as the conventional screws 22 seen in FIGS. 1 and 2. The support brackets 14 each have a first portion 16 that is parallel to the table or support surface, being generally horizontal; and they each have a second portion 18 that is perpendicular to the table or support surface, being generally vertical. Disposed between the second portions 18 of the support brackets 14 is a support block 26. Extending laterally from support block 26 are a pair of pivot pins 24 which allow the support block and the elements attached thereto to be rotated as through the lateral axis that they define, as will be discussed hereinafter. Though pivot pins are shown in the attached figures, it should be noted that any means of pivoting the device along a similar lateral axis could be utilized. The pins 24 could either be integral with the support block 26 and extend through apertures in the portions 18 of the brackets 14, they could be integral with the second, vertical portions 18 of the support brackets 14 and thus extend into indentations within the support block 26, or they could be independent of either. The pivots could also be fitted with standard bushing or roller type bearings if so desired.

Parallel to the lateral axis defined by the pivot pins 24 is a lateral bore 36 that extends entirely through the support block 26. The bore 36 is adapted and configured such that it snugly carries the long leg 40 of an L-shaped stop rod 38. There are graduations 42 marked along the long leg 40 of the stop rod 38. It is contemplated that these graduations 42 would be spaced one inch or a fraction thereof apart from one another to allow the user to position the stop rod with a good deal of precision, as will be discussed further below. Also running parallel to the lateral rotational axis defined by the pivot pins 24 is a workpiece cradle 28. This is formed by a groove or indentation extending laterally across and disposed into the top of the support block 26. The cradle defines a front support block portion 30. Additionally, the cradle 28 is interrupted by the cutting slot 34 proximate the side 35 of the support block 26 nearest the rotary cutting blade 54 and motor housing 56. The cutting slot 34 is perpendicular to the lateral rotational axis of the support block 26 and is of sufficient width and depth such that the rotary cutting blade 54 can pass through it, as will be discussed further below. Additionally, located between the cutting slot 34 and the side 35 of the support block 26 is a downwardly ramped or beveled portion 37 which ensures that, when the workpiece shaft 32 is cut, the detached portion (not shown) will fall downward. This ramped or beveled portion 37 is most clearly seen in FIG. 1 and, in effect, forms a detached portion of the floor of the cradle 28.

Figure 2:
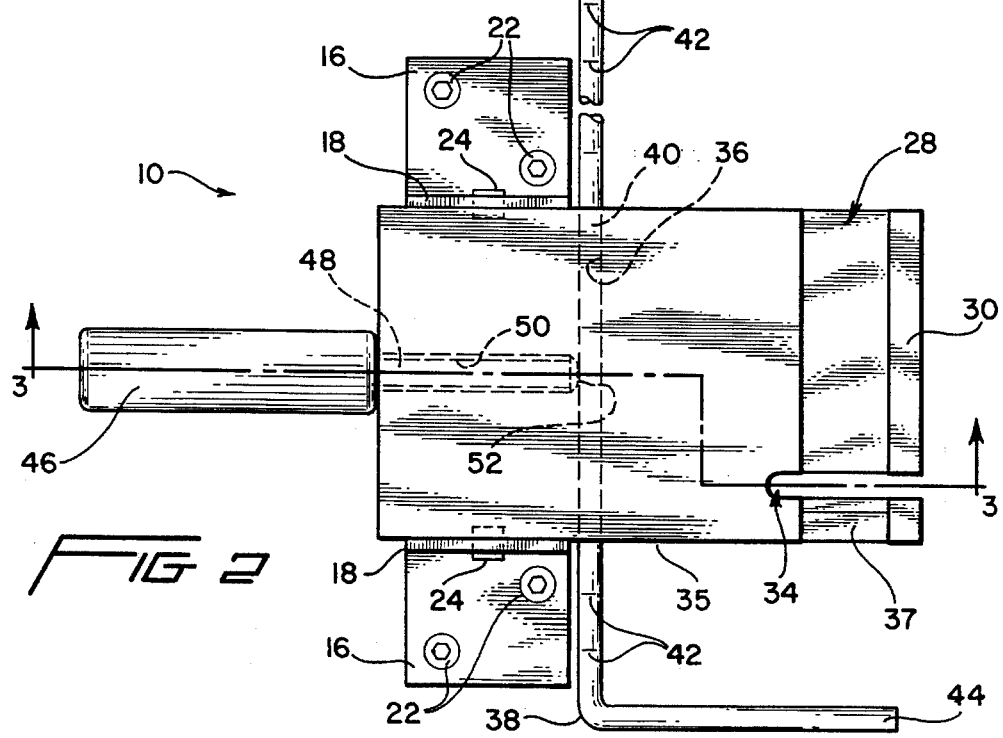
FIG. 2 is a top view of the preferred embodiment.
Figure 3:
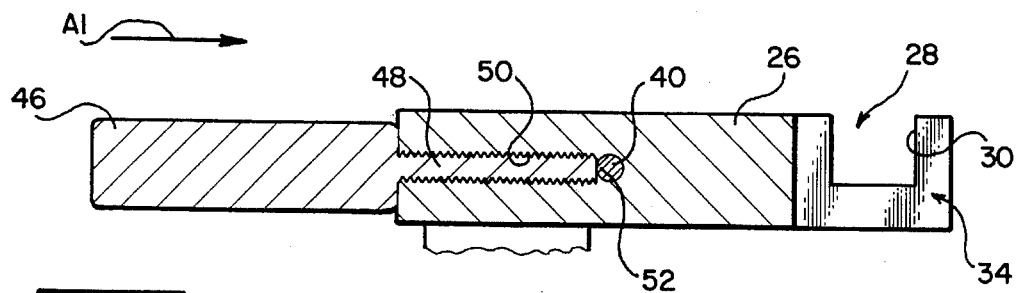
FIG. 3 is a cutaway side view taken along line 3—3 in FIG. 2 of the support block and handle of the preferred embodiment of the invention.

Referring now to the operating handle 46 of the device and the various means which are used to hold the L-shaped stop rod 38 in place after the rod 38 has been adjusted to the desired cutting length, it may be seen in FIGS. 2 and 3, operating handle 46 has, integral therewith, a threaded member 48 having a stop rod engaging tip or locking end 52 which extends within a cooperating threaded bore 50 disposed within the supporting block 26. Thus, while the user grips the handle 46, rotating the handle 46 in a clockwise direction would impel the locking end 52 (as shown by the arrow A1 in FIG. 3) into contact with the stop rod 38, holding it in the desired position in relation to the rest of the apparatus 10. Likewise, rotating the handle in a counter-clockwise direction would have the opposite effect, moving the locking end 52 out of contact with the stop rod 38 and allowing free adjustment thereof. This embodiment, it can be thus seen, allows for an easy and smooth operation of the device if a number of different lengths need to be cut off separate shafts. The user does not have to release his grip on the handle 46 during the adjustment portion of the operation.

Figure 7:
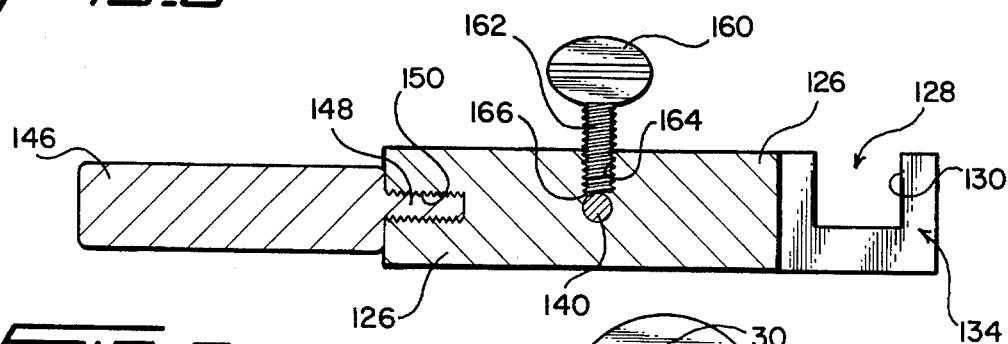
FIG. 7 is a view taken along the same lines as FIG. 3 showing an alternative embodiment of the invention wherein a thumbscrew extending into the top of the support block is used to hold the stop rod in the desired position.

Turning to FIG. 7, there is shown an alternative embodiment of the invention. In this embodiment, a supporting block 126 has disposed within it, similarly to that above, a workpiece cradle 128, a front support block portion 130, a cutting slot 134, a long leg 140 of a stop rod (not shown in its entirety), and an operating handle 146. In this embodiment, however, the bore 150 and the threaded member 148 do not extend as far into the support block 126, and are cooperatively threaded only to aid in assembly and disassembly of the unit. The means that is used to maintain the stop rod (not completely shown) in the desired position consist of a thumb screw 160 having a threaded shank 162 extending into a cooperatively threaded bore 164 in the support block 126. At the end of the shank 162 is locking end 166 that engages the leg 140 of the stop rod.

Figure 6:
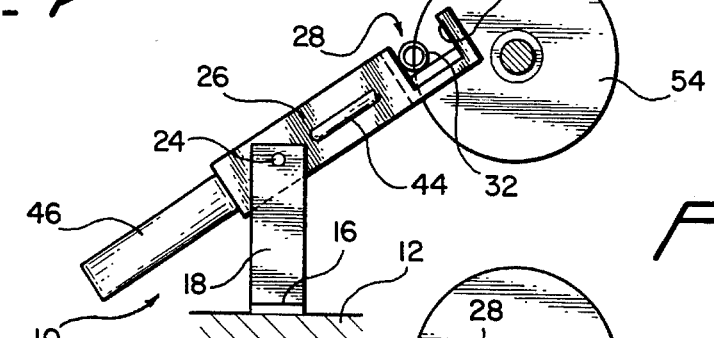
FIG. 6 is a partial cutaway side view similar to FIGS. 4 and 5 showing continuation of the rotation through the cutting blade.
Figure 5:
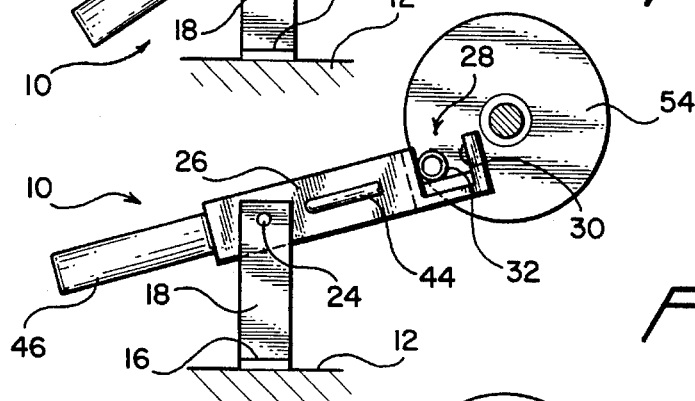
FIG. 5 is a partial cutaway view similar to FIG. 4 showing the support block being rotated and the cutting blade severing the workpiece.
Figure 4:
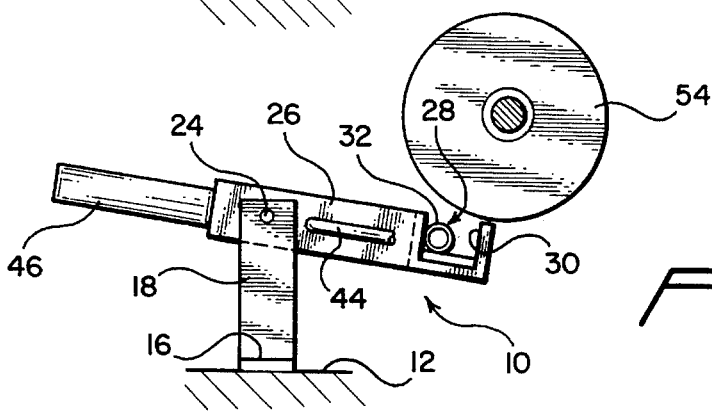
FIG. 4 is a partial cutaway view of the present invention showing a position in which the workpiece is in the cradle before cutting has commenced.

The discussion will now turn to the operation of the device. In the preferred embodiment, the user rotates the handle 46 of the apparatus 10 to disengage the locking end 52 of the threaded member 48 from the leg 40 of the stop rod 38. With the aid of the calibrated graduations 42, the user locates the stop rod 38 within the lateral bore 36 so that the short leg 44 of the stop rod 38 is disposed the required distance from the cutting slot 34. The handle 46 is then rotated in the opposite direction to bring the locking end 52 of the threaded member 48 into firm contact with the leg 40 and the workpiece 32 is placed within the cradle 28 and moved so that the end that the user is desirous of removing abuts the short leg 44 of the stop rod 38, as seen in FIG. 1. With the user gripping the long end of shaft 32 with one hand, the device is rotated on the pivot pins 24 with the other hand. FIGS. 4, 5, and 6 show various positions of shaft 32 with respect to cutter 54 encountered during the device rotation. This brings the rotary cutter blade 54 within and through the cutting slot 34. When the proper length is removed, the ramped or beveled portion 37 allows the weight of the cut section to easily cause it to fall in a downward direction. During the cutting operation, it should be noted, the pressure of the cutter blade 54 helps to keep the workpiece 32 within the cradle 28 due to the counterclockwise rotation. Both the rotary blade 54 and the motor housing 56 are well known devices and are presumably placed in a fixed relationship to the apparatus 10.

In the alternate embodiment of FIG. 7, the operation is the same except for the fact that thumb screw 160, with threads 162 and locking end 166 is used to firmly grip leg 140 of a stop rod as stop rod 38 in FIG. 1.

It is contemplated that the device would be made of a suitable material, with a number of various metals such as aluminum and various grades of steel immediately occurring to any person skilled in the art.

It is to be understood that the present invention is not limited to the sole embodiment described above, but encompasses any and all embodiments within the scope of the following claims.

We claim:

1. An apparatus for holding a shaft workpiece, for adjustably determining the length of a piece to be cut therefrom, and for moving the workpiece through a rotating cutting blade, comprising:

a base, said base being generally parallel to a table or support surface;

a rotatable support block, said support block including means to define a lateral rotational axis for said support block at a fixed distance from said base, an operating handle protruding from said support block, and a workpiece cradle, said workpiece cradle further including a cutting slot disposed perpendicular to said lateral rotational axis;

said means to define a lateral rotational axis for said support block including rotatable attachment means to hold said lateral axis rotational means at a fixed distance from said base;

adjustable workpiece placement stop, said placement stop being disposed within a lateral bore in said support block and having a workpiece engaging portion, said placement stop including calibration means for determining the distance between said cutting slot and said workpiece engaging portion;

means to frictionally engage said workpiece placement stop such that unintended movement changing the distance between said cutting slot and said workpiece engaging portion of said workpiece placement stop is obviated immediately before and during the cutting process;

and wherein said cradle includes a beveled, downwardly ramped portion disposed proximate to at least one side of said support block to facilitate descent of severed portions of workpieces to be discarded.

2. The apparatus according to claim 1, wherein said means to define a lateral rotational axis is fixed to said base and comprises a pair of spaced apart, generally vertical members.

3. The apparatus according to claim 2, wherein said rotatable attachment means comprises a pair of pivot pins integral with said support block and engaging with a pair of cooperating apertures on said spaced apart, vertical members.

4. The apparatus according to claim 2, wherein said rotatable attachment means comprises a pair of pivot pins integral with said spaced apart, vertical members and engaging a pair of cooperating indentations on said support block.

5. The apparatus according to claim 1, wherein said handle includes a threaded member that engages with a cooperating threaded bore extending in said support block, said threaded bore being perpendicular to said lateral rotational axis, such that said handle may be removed for assembly and disassembly, and provides a convenient grip for urging said support block, said workpiece cradle, and a workpiece contained therein about said rotational axis.

6. The apparatus according to claim 5, wherein said frictional engagement means comprises said threaded member having a locking end, and where said cooperating threaded bore extends into said supporting block such that communication exists between said cooperating threaded bore and said lateral bore carrying therewithin said workpiece placement stop whereby rotation of said handle urges said locking end into contact with said placement stop, preventing unintended movement.

7. The apparatus according to claim 5, wherein said frictional engagement means comprises a thumbscrew having a threaded shank, said threaded shank including a shank locking end, said shank extending into a cooperating shank receiving threaded bore extending into said support block such that communication exists between said cooperating shank receiving threaded bore and said lateral bore carrying therewithin said workpiece placement stop whereby rotation of said thumbscrew urges said shank locking end into contact with said placement stop, preventing unintended movement.

8. The apparatus according to claim 1, wherein said workpiece placement stop comprises a first, long leg carried within said lateral bore and a second, short leg, said short leg being in a perpendicular arrangement in relation to said first leg, and where said second, short leg comprises said workpiece engagement portion.

9. The apparatus according to claim 8, wherein said calibration means comprise a plurality of graduated marks spaced apart along said first, long leg of said workpiece placement stop, said graduated marks being spaced at a regular, predetermined distance from one another.

10. The apparatus according to claim 1, wherein said cutting means is a rotary cutting blade powered by a conventional motor.

* * * * *